（12）United States Patent
Balfe et al.

(10) Patent No.: US 9,162,177 B2
(45) Date of Patent: Oct. 20, 2015

(54) AMMONIA CAPTURING BY $CO_2$ PRODUCT LIQUID IN WATER WASH LIQUID

(75) Inventors: Michael C. Balfe, Wiesbaden (DE); Rameshwar S. Hiwale, Knoxville, TN (US); Joseph P. Naumovitz, Lebanon, NJ (US)

(73) Assignee: ALSTOM Technology Ltd, Baden (CH)

( * ) Notice: Subject to any disclaimer, the term of this patent is extended or adjusted under 35 U.S.C. 154(b) by 801 days.

(21) Appl. No.: 13/357,963

(22) Filed: Jan. 25, 2012

(65) Prior Publication Data

US 2013/0186272 A1 Jul. 25, 2013

(51) Int. Cl.
*B01D 53/14* (2006.01)
*B01D 53/58* (2006.01)

(52) U.S. Cl.
CPC ............ *B01D 53/1475* (2013.01); *B01D 53/58* (2013.01); *B01D 53/1406* (2013.01); *B01D 2252/102* (2013.01); *B01D 2257/406* (2013.01); *B01D 2257/504* (2013.01); *B01D 2258/025* (2013.01); *B01D 2258/0283* (2013.01); *B01D 2258/0291* (2013.01); *Y02C 10/06* (2013.01)

(58) Field of Classification Search
None
See application file for complete search history.

(56) References Cited

U.S. PATENT DOCUMENTS

| | | |
|---|---|---|
| 2,106,734 A | 2/1935 | Gollmar |
| 2,043,109 A | 6/1936 | McKee et al. |
| 2,487,576 A | 11/1949 | Meyers |
| 2,608,461 A | 8/1952 | Frazier |
| 2,878,099 A | 3/1959 | Breuing et al. |
| 3,255,233 A | 6/1966 | Kunze et al. |
| 3,923,955 A | 12/1975 | Fattinger |
| 4,515,760 A | 5/1985 | Lang et al. |
| 4,847,057 A | 7/1989 | Brugerolle et al. |
| 4,977,745 A | 12/1990 | Heichberger |

(Continued)

FOREIGN PATENT DOCUMENTS

| | | |
|---|---|---|
| AU | 648129 | 7/1992 |
| AU | 678622 | 6/1995 |

(Continued)

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

(Continued)

*Primary Examiner* — Duane Smith
*Assistant Examiner* — Phillip Shao
(74) *Attorney, Agent, or Firm* — Cynthia W. Flanigan

(57) ABSTRACT

A method for capturing ammonia present in combustion flue gas subjected to carbon dioxide removal, using a water wash unit (102) included in a chilled ammonia process, comprises:
  providing $CO_2$ loaded liquid (122) comprising $CO_2$ dissolved in the liquid;
  providing wash water liquid (108, 138);
  combining the $CO_2$ loaded liquid with the wash water liquid to form $CO_2$ enriched wash water liquid (105, 106) before the liquid is added said water wash unit (102); and
  bringing said combustion flue gas into contact with said $CO_2$ enriched wash water liquid by adding the $CO_2$ enriched wash water liquid to said water wash unit (102).

10 Claims, 2 Drawing Sheets

(56) References Cited

U.S. PATENT DOCUMENTS

| | | |
|---|---|---|
| 4,999,031 A | 3/1991 | Gerhardt et al. |
| 5,067,972 A | 11/1991 | Hemmings et al. |
| 5,137,550 A | 8/1992 | Hegarty et al. |
| 5,186,916 A | 2/1993 | Nevels |
| 5,318,758 A | 6/1994 | Fujii |
| 5,378,442 A | 1/1995 | Fujii et al. |
| 5,427,759 A | 6/1995 | Heitmann |
| 5,453,115 A | 9/1995 | Vuletić |
| 5,462,583 A | 10/1995 | Wood et al. |
| 5,599,508 A | 2/1997 | Martinelli et al. |
| 5,648,053 A | 7/1997 | Mimura et al. |
| 5,700,311 A | 12/1997 | Spencer |
| 5,756,058 A | 5/1998 | Watanabe et al. |
| 5,832,712 A | 11/1998 | Rønning et al. |
| 5,853,680 A | 12/1998 | Iijima et al. |
| 5,979,180 A | 11/1999 | Lebas et al. |
| 6,027,552 A | 2/2000 | Ruck et al. |
| 6,210,467 B1 | 4/2001 | Howard |
| 6,348,088 B2 | 2/2002 | Chung |
| 6,372,023 B1 | 4/2002 | Kiyono et al. |
| 6,458,188 B1 | 10/2002 | Mace |
| 6,485,547 B1 | 11/2002 | Iijima |
| 6,497,852 B2 | 12/2002 | Chakravarti et al. |
| 6,506,350 B2 | 1/2003 | Cooper et al. |
| 6,759,022 B2 | 7/2004 | Hammer et al. |
| 6,764,530 B2 | 7/2004 | Iijima |
| 7,022,296 B1 | 4/2006 | Khang et al. |
| 7,083,662 B2 | 8/2006 | Xu et al. |
| 7,128,777 B2 | 10/2006 | Spencer |
| 7,160,456 B2 | 1/2007 | Järventie |
| 7,255,842 B1 | 8/2007 | Yeh et al. |
| 2003/0045756 A1 | 3/2003 | Mimura et al. |
| 2003/0140786 A1 | 7/2003 | Iijima |
| 2004/0123736 A1 | 7/2004 | Torres, Jr. et al. |
| 2004/0126294 A1 | 7/2004 | Cooper et al. |
| 2005/0169825 A1 | 8/2005 | Cadours et al. |
| 2006/0178259 A1 | 8/2006 | Schubert et al. |
| 2006/0204425 A1 | 9/2006 | Kamijo et al. |
| 2007/0006565 A1 | 1/2007 | Fleischer et al. |
| 2008/0072762 A1 | 3/2008 | Gal |
| 2008/0178733 A1 | 7/2008 | Gal |
| 2008/0307968 A1* | 12/2008 | Kang et al. .......... 95/199 |
| 2009/0101012 A1 | 4/2009 | Gal et al. |
| 2009/0155889 A1 | 6/2009 | Handagama et al. |
| 2009/0282977 A1* | 11/2009 | Koss ................. 95/199 |
| 2010/0294131 A1* | 11/2010 | Bade et al. .......... 95/223 |
| 2011/0067567 A1* | 3/2011 | Kozak et al. ........ 95/187 |
| 2011/0100216 A1* | 5/2011 | Kozak et al. ........ 95/168 |
| 2012/0060689 A1* | 3/2012 | Naumovitz et al. ..... 95/165 |

FOREIGN PATENT DOCUMENTS

| | | |
|---|---|---|
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| DE | 469840 | 12/1928 |
| DE | 2832493 | 7/1978 |
| DE | 3633690 | 4/1988 |
| DE | 10 2005 033837 | 1/2007 |
| EP | 0243778 | 11/1987 |
| EP | 0502596 | 9/1992 |
| EP | 0553643 | 8/1993 |
| EP | 0588178 | 3/1994 |
| EP | 1759756 | 3/2007 |
| EP | 2338583 A2 | 6/2011 |
| GB | 271852 | 5/1926 |
| GB | 871207 | 6/1961 |
| GB | 899611 | 6/1962 |
| GB | 2331526 | 5/1999 |
| JP | 10 202054 | 8/1998 |
| JP | 11 137960 | 5/1999 |
| KR | 100703999 B1 | 3/2007 |
| SU | 512785 | 5/1976 |
| SU | 1567251 | 5/1990 |
| WO | 98/47604 | 10/1998 |
| WO | 02/09849 | 2/2002 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2008/072979 | 6/2008 |
| WO | 2008/094777 | 8/2008 |
| WO | 2008/101293 | 8/2008 |
| WO | 2008/144918 | 12/2008 |
| WO | 2009/138363 | 11/2009 |
| WO | 2010/039612 A1 | 4/2010 |
| WO | 2010/053683 | 5/2010 |
| WO | 2011/084254 | 7/2011 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of $CO_2$, $SO_2$ and $NO_x$," Int. J. Environmental Tech. And Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliminary Results" International Journal of Thermodynamics, International Centre for Applied Thermodynamics, Istanbul, TR, vol. 7, No. 4, Dec. 1, 2004, pp. 173-181.

"Semi-batch absorption and regeneration studies for CO2 capture by aqueous ammonia", Fuel Processing Technology, vol. 86, No. 14-15, Oct. 1, 2005, pp. 1533-1546.

International Search Report and Written Opinion of the International Searching Authority, PCT Patent Application No. PCT/IB2013/050631, mailed Jun. 4, 2013 (Apr. 6, 2013).

* cited by examiner

őé

AMMONIA CAPTURING BY CO₂ PRODUCT LIQUID IN WATER WASH LIQUID

FIELD OF THE INVENTION

The present invention relates to method and system for treating a combustion flue gas. More specifically it relates to capturing ammonia in a chilled ammonia process (CAP).

BACKGROUND

Liquid solutions comprising amine compounds or aqueous ammonia solutions are commonly used as solvents in processes used for industrial separation of acidic components such as $H_2S$, $CO_2$, COS and/or mercaptans from gas streams such as flue gas, natural gas, synthetic gas or other gas streams mainly containing nitrogen, oxygen, hydrogen, carbon monoxide and/or methane. The acidic components are often absorbed in the solvent in an absorption process or scrubbing process. After "scrubbing" of said acidic components by said solutions, contaminants, such as traces of ammonia, have to be removed from the gas stream in a separate process step.

The most commonly used process for this purpose is a wash or scrubbing step of the contaminants. In such a wash water step, the gas stream is scrubbed with water in a suitable contacting device. Typically, the water used to scrub the gas stream is either fresh water or very low $NH_3$ content water obtained from a stripping process related to the treatment of the gas stream. After the gas stream is scrubbed with water, the water is 1) sent back to the stripping unit from which it was obtained or 2) simply mixed with the solution used in the main scrubbing process.

There are methods known wherein the efficiency of the system and methods are improved. In WO 2009/138363 it is disclosed a method for removal of contaminants from a gas stream by contacting the gas stream with $CO_2$ containing liquid. The methods are said to be applicable for contaminants like ammonia, where the emission of the contaminants is reduced. Also in U.S. Pat. No. 5,378,442 there is described a method to contact $CO_2$ containing liquid for recovering of ammonia present in the combustion exhaust gas.

Regeneration of used wash liquids in the scrubbing process, for example in a stripping unit, is generally energy intensive and by that an expensive process. Therefore, there is a constant need for processes that improve wash efficiency and/or reduce wash liquid consumption. Regeneration of used wash liquids may be accomplished via stripping where a particular component is stripped from a wash liquid to regenerate the wash liquid.

SUMMARY OF THE INVENTION

It is an object of the present invention to improve the efficiency of a wash/scrubbing step in a gas purification process, more specifically, to improve the capture and recovery of ammonia from a treated combustion gas in an absorber system.

The improved method and system for capturing ammonia in a chilled ammonia process (CAP) according to various aspects described herein, ultimately allows a reduction in the concentration of ammonia exiting the wash/scrubbing step and thus increases the quantity of recycle ammonia back the absorber system. This helps to retain the concentration of ammonia in solution in the absorber system and also to prevent excessive ammonia losses.

Reducing ammonia emission in the treated flue gas flowing from the water wash unit supports retention of the ammonia in the chilled ammonia process. It will also reduce the amount of sulfuric acid needed to neutralize ammonia when reheating the treated flue gas in a downstream process.

According to aspects illustrated herein, there is provided a method for capturing ammonia present in combustion flue gas having been subjected to carbon dioxide removal in a water wash unit included in a chilled ammonia process, comprising the steps of:
providing $CO_2$ loaded liquid comprising $CO_2$ dissolved in the liquid;
providing wash water liquid;
combining the $CO_2$ loaded liquid with the wash water liquid to form $CO_2$ enriched wash water liquid before the liquid is added to the water wash unit to suppress the equilibrium vapor pressure of $NH_3$ present over the surface of the $CO_2$ enriched wash water liquid; and
bringing said combustion flue gas into contact with said $CO_2$ enriched wash water liquid by adding the $CO_2$ enriched wash water liquid to said water wash unit.

The $CO_2$ loaded liquid from, for example, a $CO_2$ cooler is continuously added to the wash water to maintain a low ammonia partial pressure The amount of said liquid can be adjusted, reduced or increased, based on ammonia emissions from the water wash system, and the required ammonia partial pressure in the solution, in order to meet washing requirements.

According to some embodiments of the method, the concentration of ammonia in the wash water may be in the range of 0.0005-3 mol/liter. In a water wash unit with a top stage and a lower stage, the concentration of ammonia may, for example, be about 0.005 to 0.2 mol/l in the top stage, and about 0.5 to 3 mol/l in the lower stage. This concentration covers the range for both lean wash water and wash water mixed with the $CO_2$ loaded liquid. By operating with this concentration of ammonia in the wash water, the vapor pressure of the ammonia can be kept at low level, e.g., low enough to wash ammonia in the gas phase down to less than 200 ppm. In general, ammonia capture can be improved (and the partial pressure of $NH_3$ kept low) by lowering the concentration of $NH_3$ in the wash water solution, by lowering the operating temperature of the wash liquid and/or chemically depressing the partial pressure of ammonia via the mixing of $CO_2$ loaded liquid streams. As long as the partial pressure of $CO_2$ over the said liquid is high, and solids are not formed, the concentration of $NH_3$ is of less importance.

According to some embodiments of the method, the ratio of moles of ammonia ($NH_3$) to moles of carbon dioxide ($CO_2$) (the R value) for the $CO_2$ enriched wash water liquid is kept at about 0.05 to 10, preferably at about 0.1 to 5, more preferably at about 1.

According to some embodiments of the method, the concentration of ammonia in the wash water is in the range of 0.0005-3 mol/liter, preferably in the range of 0.05-2 mol/liter, and a partial pressure of $CO_2$ in the liquid phase between 1 and 20 bar.

According to some embodiments of the method, the wash water liquid used for ammonia removal comprises about 0.0005 mol/liter to 0.2 mol/liter ammonia ($NH_3$) before it is combined with the $CO_2$ loaded liquid.

According to some embodiments of the method, the operating temperature of the wash water unit is about 1° C. to about 10° C.; preferably about 5° C.

By performing the method for recapturing ammonia in these specified temperature ranges the vapor pressure of ammonia may be kept low. Any refrigerant can be considered as working medium as long as these operating temperatures can be achieved. Suitable refrigerants may be propane, propylene as well as ammonia.

According to some embodiments of the method, the ratio of moles of ammonia ($NH_3$) to moles of carbon dioxide ($CO_2$), also denoted as the R value, is kept at about 0.05 to 10 for the $CO_2$ enriched wash water liquid, preferably at about 0.1 to 5, more preferably about 1 to 4. The lower R value of the water wash liquid the better results of the ammonia capture.

According to aspects illustrated herein, there is provided a gas purification system for capturing ammonia ($NH_3$) from combustion flue gas by bringing said gas into contact with $CO_2$ enriched wash water liquid containing dissolved carbon dioxide $CO_2$ in liquid form wherein the system comprises:
 a water wash unit for capturing ammonia $NH_3$,
 one or more wash water liquid ducts for recirculating wash water liquid;
 one or more units generating $CO_2$ loaded liquid;
 a $CO_2$ loaded liquid duct transporting the $CO_2$ loaded liquid to the wash water liquid duct from the one or more units for generating $CO_2$ loaded liquid to suppress the equilibrium vapor pressure of $NH_3$ over the wash water liquid; and
 one or more $CO_2$ enriched wash water liquid ducts transporting the $CO_2$ enriched wash water liquid resulting after integrating the $CO_2$ loaded liquid and the wash water liquid to the water wash unit for bringing the $CO_2$ enriched wash water liquid into contact with the combustion flue gas.

According to some embodiments of the gas purification system, the units for generating $CO_2$ loaded liquid is a $CO_2$ product cooler and/or a $CO_2$ compressor system, working separately or together to generate $CO_2$ loaded liquid.

According to aspects illustrated herein, there is provided a gas purification system for capturing ammonia ($NH_3$) from combustion exhaust gas by a wash water unit comprising at least one packed bed section, preferably two or more packed bed sections.

The water wash unit may be a suitable container, like a column. The packed bed may be selected to provide a sufficient mass transfer of the components present in the water wash unit, thus to absorb the $NH_3$ from the combustion exhaust gas. The water wash unit may comprise one or more packed beds, being the same or different, and arranged in different ways.

According to some embodiments of the gas purification system the $CO_2$ enriched wash water liquid is introduced to the bottom section of the wash water unit by the $CO_2$ enriched wash water liquid duct.

The integration of $CO_2$ loaded liquid from the $CO_2$ product cooler and/or the $CO_2$ product compressor can be introduced to either water wash top section or water wash bottom section or in some cases in both sections of the water wash unit. Preferably it should be introduced in the top section to achieve better performance.

According to some embodiments of the gas purification system, the water liquid being subjected to ammonia capturing comprises less than 0.2 mol/l ammonia ($NH_3$).

According to some embodiments of the gas purification system described above, water wash unit is operated at a temperature of about 1° C. to about 10° C.; preferably about 5° C. The operating temperature of the system is dependent on the particular refrigerant used in the system. Suitable refrigerants may be propane, propylene, as well as ammonia.

According to some embodiments of the gas purification system, carbon dioxide $CO_2$ in liquid form is reintroduced into the wash water liquid after separation and liquefaction in a $CO_2$ product cooler unit.

According to some embodiments of the gas purification system, the carbon dioxide $CO_2$ in liquid form is reintroduced into the wash water stream after separation and liquefaction in a $CO_2$ product cooler unit forming a $CO_2$ cooler $CO_2$ loaded liquid.

According to some embodiments of the gas purification system, the carbon dioxide $CO_2$ in liquid form is reintroduced into the wash water stream after separation and liquefaction in a $CO_2$ compressor system forming an interstage cooler $CO_2$ rich condensate.

According to some embodiments of the gas purification system, the carbon dioxide $CO_2$ in liquid form is reintroduced into the water wash unit after separation and liquefaction in a $CO_2$ product cooler unit in combination with a $CO_2$ compressor system.

The term "wash water", as used herein, refers generally to an aqueous medium used for removal of contaminants from a gas stream by bringing said gas stream into contact with said wash water, resulting in the absorption of contaminants from said gas stream into said wash water. The wash water containing the absorbed contaminants is generally recycled, e.g., in a stripping unit, where the contaminants may be concentrated for incineration or purification and reuse. In other words, the economics of the water wash step are dictated by the amount of wash water needed to reach the required removal levels of trace contaminants. The amount of wash water needed to properly scrub the gas stream is dictated by the absorption capacity of the water for the respective trace contaminants, i.e. the vapor/liquid equilibrium between the contaminant in the gas phase and in the water phase.

Alternatively, the improved absorption capacity of the wash water may be used to further reduce the amount of contaminants present in the gas stream leaving the water wash step, without increasing wash water consumption. In other words, emissions can be reduced without a corresponding increase in costs due to increased water and energy consumption.

The use of liquid $CO_2$ to improve the absorption capacity of wash water is further advantageous because, e.g., i) $CO_2$ is odorless and relatively non-toxic, ii) any $CO_2$ remaining in the wash water after use may easily be removed during the regeneration of the wash water, and iii) $CO_2$ may, in at least some embodiments of the present invention, be readily available as a product from another process step.

Alkaline compounds are often used in absorption processes for removal of acidic gases, such as $CO_2$, $H_2S$ and COS from gas streams. Ammonia is one example of such alkaline compound, and the chilled ammonia process (CAP) is a method for this. The gas purification method of the present invention is efficient for the removal of ammonia contaminating the gas stream from use in the chilled ammonia process. By the invention, a gas purification system for the improved method is provided.

DETAILED DESCRIPTION

Specific embodiments of gas purification systems of the prior art and of the present invention are described in detail hereinbelow with reference to the drawings.

Figure 1:
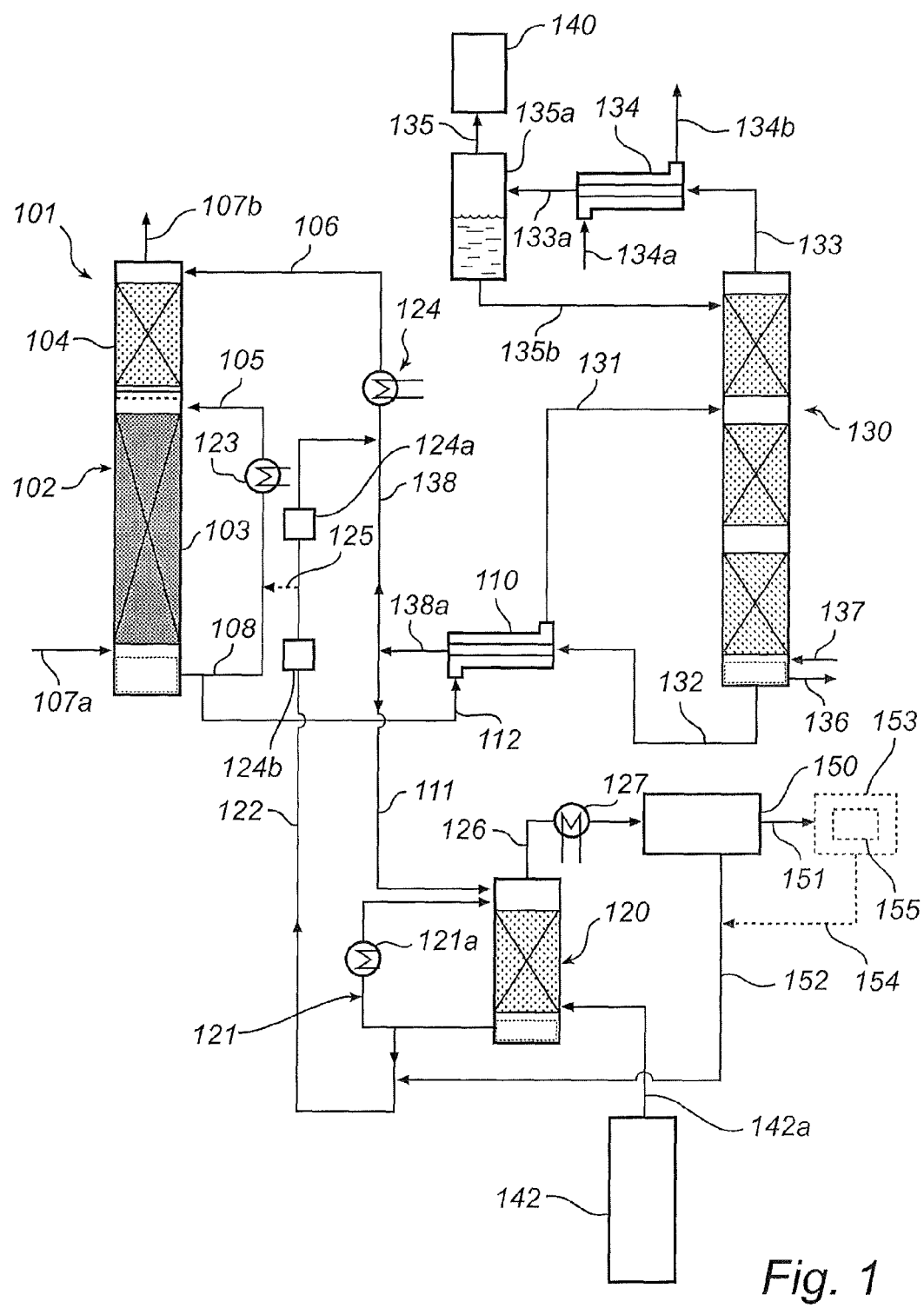
FIG. 1 is a flow diagram generally depicting an embodiment of an ammonia based gas purification system according to the present invention.

FIG. 1 is a schematic representation of an embodiment of an ammonia based gas purification system 101 according to the present invention. The gas purification system 101 comprises a water wash unit 102 arranged to allow contact between a gas stream to be purified and one or more wash liquids.

In accordance with one embodiment, the water wash unit 102 is arranged for cleaning a flue gas that has passed through a $CO_2$ absorber 140 of a chilled ammonia process. The chilled ammonia process is, as such, described in, for example, WO 2006/022885 (Eli GAL). Hence, the $CO_2$ absorber 140 may, for example, be arranged for capturing $CO_2$ from a flue gas of, for example, a power plant, an industrial plant, a waste incineration plant or a metallurgical plant, in accordance with the chilled ammonia process. In the chilled ammonia process $CO_2$ is captured in an ammoniated solution in the absorber 140, and the ammoniated solution is regenerated in a regenerator unit 142. Such regeneration involves heating the ammoniated solution to cause a release of $CO_2$. For reasons of maintaining clarity of illustration FIG. 1 does not illustrate the flows of ammoniated solution between the $CO_2$ absorber 140 and the regenerator unit 142, or the flow of flue gas through the absorber 140.

Flue gas that has passed through the $CO_2$ absorber 140 for carbon dioxide capture contains ammonia and is forwarded to water wash unit 102 via a duct 107a for washing, as will be described in more detail hereinafter.

$CO_2$ product that is released as an effect of the heating of the ammoniated solution in the regenerator unit 142 is forwarded via a fluidly connected duct 142a from regenerator unit 142 to a $CO_2$ product cooler unit 120. The $CO_2$ product cooler unit 120 purifies the $CO_2$ product forwarded from regenerator unit 142 by capturing ammonia and condensing water vapor from the $CO_2$ product. A liquid that contains water is circulated, via fluidly connected loop duct 121, in the $CO_2$ product cooler unit 120. The liquid circulated in loop duct 121 is cooled in heat exchanger 121a to cause condensation of water vapor from the $CO_2$ product. The liquid circulating in loop duct 121 of $CO_2$ product cooler unit 120 will capture ammonia and also some $CO_2$ from the $CO_2$ product of the regenerator unit 142. Hence, the liquid circulating in loop duct 121 will contain some dissolved ammonia, and some dissolved $CO_2$.

As will be described in more detail hereinafter, regenerated wash water, having a reduced content of ammonia, is forwarded to $CO_2$ product cooler unit 120 via duct 111, and a portion of the liquid circulated in $CO_2$ product cooler unit 120 is forwarded from the unit 120 via duct 122 fluidly connected to loop duct 121.

The water wash unit 102 is a mass transfer unit, which may comprise mass transfer enhancing arrangements, for example the water wash unit 102 may comprise a column with a packed bed wherein the packing material is selected to optimize the mass transfer in the unit 102. The packing material may be selected from many different suitable and commercially available packing materials. Also, the water wash unit 102 may be arranged to comprise one, two or more stages of washing, wherein the material forming the packed bed in each stage may be the same or different, and the arrangements, such as, for example, random or structured packaging, may be the same or different to optimize parameters such as surface area, flow pattern, mass flow, etc. The liquid flow through the unit 102 may also be arranged differently between the different stages, to optimize the system and/or mass transfer. For example, the liquid flow may be in counter current mode, with the liquid flowing in the opposite direction of the gas, with the gas flowing vertically upwards and the liquid flowing vertically downwards, or in co-current mode, with both the liquid and the gas flowing vertically down-wards. Furthermore, the liquid could either be arranged, for each of the stages, in a circulation mode, with the liquid being recirculated several times in the stage before being removed therefrom, or in a once through arrangement, in which the liquid passes once through the stage and is then removed therefrom.

In the specific embodiment of FIG. 1, the water wash unit is a water wash unit 102 that comprises a two stage wash system having sections with different packing. The bottom section 103, i.e., the lower part of the water wash unit 102, comprises structured packing and is operated in counter current mode and with circulation mode with respect to the liquid solution, and with once through mode with respect to the flue gas. The top section 104, i.e., the second section of the water wash unit 102, comprises random packing, and is operated in counter current mode with once through water flow and once through flue gas flow. Flue gas to be cleaned enters the water wash unit 102 via duct 107a. Cleaned flue gas leaves the water wash unit 102 via duct 107b.

The used wash liquid leaving the water wash unit 102 contains absorbed ammonia and leaves the water wash unit 102 via fluidly connected duct 108. The used wash liquid may be at least partly recirculated and reintroduced to the water wash unit 102 and its lower part 103 via fluidly connected duct 105.

An option of the invention is that a portion of $CO_2$ may be introduced to the wash liquid in duct 105, via fluidly connected duct 125, and $CO_2$ containing wash liquid is thus introduced to the water wash unit 102 at the bottom (first) section 103 of the unit 102. In combination with, or as alternative to, introducing a portion of $CO_2$ to the wash liquid in duct 105, and as will also be described in more detail hereinafter, a portion of $CO_2$ may be introduced to the wash liquid in duct 106, via fluidly connected duct 122, and $CO_2$ containing wash liquid is thus introduced to the water wash unit 102 at the upper (second) section 104 of the unit 102.

The liquid introduced to the water wash unit 102, via duct 105 and/or duct 106, is denoted '$CO_2$ enriched wash water liquid', which is the wash water resulting after the mixing of wash water liquid with the portion of $CO_2$. The portion of $CO_2$ may, as illustrated in FIG. 1, be $CO_2$ that has been captured in the liquid of the $CO_2$ product cooler unit 120 from the $CO_2$ product forwarded from the regenerator 142. Such liquid containing a portion of $CO_2$ dissolved therein is forwarded from $CO_2$ product cooler unit 120 to water wash unit 102 via fluidly connected duct 122, and, optionally, via fluidly connected duct 125. The dissolved $CO_2$ forwarded to the water wash unit 102 via duct 122, and optionally duct 125, serves to improve the capture of ammonia in the water wash unit 102 by reducing the vapor pressure of ammonia, as will be described in more detail hereinafter.

The content of ammonia in the flue gas entering the water wash unit 102 via duct 107a may be about 5000-16000 ppm.

Flue gas with a reduced content of ammonia leaves the water wash unit 102 via fluidly connected duct 107b and is, for example, forwarded to a direct contact cooler (DCC) unit, not shown for reasons of maintaining clarity of illustration. The amount of ammonia in the flue gas leaving the water wash unit 102 via duct 107b may be about 0-500 ppm, preferably less than 200 ppm.

A portion, which may be referred to as "spent wash water", of the wash water liquid leaving the water wash unit 102 via duct 108 may be fed to a heat exchanger 110 via fluidly connected duct 112. In the heat exchanger 110 the spent wash water coming from water wash unit 102 via ducts 108, 112 exchanges heat with a flow of regenerated wash water coming from a stripper unit 130 via a fluidly connected duct 132. The spent wash water coming from water wash unit 102 is, hence, forwarded to heat exchanger 110 via duct 112 and leaves heat exchanger 110 via fluidly connected duct 131. Fluidly connected duct 131 forwards the spent wash water to the stripper unit 130. Typically, the spent wash water forwarded to stripper unit 130 via fluidly connected duct 131 may comprise ammonia in a concentration in the range of 0.5-3 mol/liter. In stripper unit 130 at least a portion of the content of ammonia of the spent wash water is removed, thereby generating, as will be described in more detail hereinafter, a regenerated wash water, that leaves stripper unit 130 via the fluidly connected duct 132. Typically, the regenerated wash water leaving stripper unit 130 via fluidly connected duct 132 may comprise ammonia in a concentration in the range of 0.005-0.2 mol/liter.

The regenerated wash water is forwarded via duct 132 to the heat exchanger 110 in which the regenerated wash water is heat exchanged with the spent wash water transported in ducts 112, 131. The regenerated wash water forwarded via duct 132 has a higher temperature than the spent wash water forwarded via duct 112. Hence, in heat exchanger 110 the spent wash water is heated before being forwarded, via fluidly connected duct 131, to the stripper unit 130. Such reduces the amount of heat that must be supplied to stripper unit 130 to achieve the stripping of ammonia from the spent wash water. The regenerated wash water forwarded from stripper unit 130 via fluidly connected duct 132 is cooled in the heat exchanger 110 before being forwarded, via fluidly connected duct 138a, to fluidly connected duct 138 and further, optionally via heat exchanger 124, to the upper section 104 of the water wash unit 102, and via fluidly connected duct 111 to the $CO_2$ product cooler unit 120.

Regenerated wash water is, hence, forwarded from the heat exchanger 110 to the $CO_2$ product cooler unit 120 via fluidly connected ducts 138a, 111. The flow rate of the water flow to the $CO_2$ product cooler unit 120 is typically about 5 l/min to 300 l/min, for example about 5 l/min to 200 l/min. In the $CO_2$ product cooler unit 120, $CO_2$ containing water is recirculated into the $CO_2$ cooler unit 120 by fluidly connected loop duct 121. From the duct 121, a part of the $CO_2$ containing water is split and water is transported to the water wash unit 102 via fluidly connected duct 122, with a flow rate of about 5 l/min to 300 l/min. The liquid forwarded in duct 122 may also be denoted '$CO_2$ loaded liquid', i.e., liquid comprising the dissolved $CO_2$ and forwarded from the $CO_2$ cooler unit 120.

In one embodiment, the duct 122 is connected to the recycling loop, duct 108 of the bottom section 103, via fluidly connected duct 125, wherein the $CO_2$ containing water from the $CO_2$ product cooler unit 120 is mixed with the water reintroduced via duct 105 after passing the heat exchanger 123, into the bottom, first section 103 of the water wash unit 102.

In one embodiment of the invention, the duct 122 is fluidly connected to the duct 138, wherein the $CO_2$ containing water is mixed with the regenerated wash water forwarded from the heat exchanger 110, and further forwarded via duct 106, to the water wash unit 102 and its top section 104.

From the $CO_2$ product cooler unit 120 cooled $CO_2$ product is forwarded via a duct 126 and an optional heat exchanger 127, to a $CO_2$ compressor system 150 generating a compressed $CO_2$ rich gas transported via fluidly connected duct 151 for further processing. The condensate, comprising water and $CO_2$, obtained in the $CO_2$ compressor system 150 as an effect of intercooling between compression stages may be recycled to the gas purification system 101 via fluidly connected duct 152. The liquid is herein denoted '$CO_2$ compressor interstage cooler $CO_2$ rich condensate'. The duct 152 is fluidly connected to the duct 122 and the '$CO_2$ compressor interstage cooler $CO_2$ rich condensate' is forwarded to the water wash unit 102 as described above.

Optionally, in the gas purification system 101 the carbon dioxide $CO_2$ in liquid form is reintroduced into the water wash unit 102 via fluidly connected ducts 154 and 152 after separation and liquefaction in a $CO_2$ product cooler unit 155, which may be a cryogenic unit for separating carbon dioxide from non-condensable gases, such as oxygen and nitrogen, such unit 155 being included in a high pressure $CO_2$ compressor system 153.

In one embodiment, the $CO_2$ containing liquid is generated by combining the $CO_2$ cooler loaded wash water solution forwarded via duct 121 to duct 122 and the $CO_2$ compressor interstage cooler $CO_2$ rich condensate forwarded via duct 152.

Optionally, the $CO_2$ containing water passes through heat exchanger units 124a, 124b before entering the water wash unit 102 at a temperature of about 3 to about 7° C.

The heat exchanger unit 110 is fluidly connected to the stripper unit 130, via fluidly connected ducts 131 and 132, wherein heat is transferred from the stripper bottom stream to the feed stream to minimize energy consumption in the stripper unit 130, as well as to provide low temperature liquid to the water wash unit 102 to reduce chiller load. For example, the stripper unit 130 may operate at a temperature of more than 120° C. and with a pressure of more than 20 bar. The stripper unit 130 is heated by steam via fluidly connected ducts 136 and 137. In the stripper unit 130 ammonia is removed from the spent wash water coming from the water wash unit 102 via duct 131 and the ammonia is, via fluidly connected duct 135, transferred to the $CO_2$ absorber 140 for further treatment, such as capturing $CO_2$. The gas containing ammonia and leaving the stripper unit 130 via a duct 133 passes a condenser 134 on its way to the regenerator or absorber system depending on stripper operating pressure. A cooling liquid is forwarded to condenser 134 via a fluidly connected duct 134a, and leaves the condenser 134 via fluidly connected duct 134b. The cooling liquid forwarded through condenser 134 via ducts 134a, 134b could be of various origins. For example, the cooling liquid could be ammoniated solution forwarded from absorber 140 to regenerator unit 142 for being regenerated therein. The cooling liquid of condenser 134 could also, for example, be feed water for a boiler, or another cooling water available in the plant. Vapor and liquid formed in the condenser 134 as an effect of the cooling of the gas leaving stripper unit 130 via duct 133 leave condenser 134 via fluidly connected duct 133a and are forwarded to a vapor-liquid separator 135a. In vapor-liquid separator 135a gas and liquid are separated from each other. The liquid collected at the bottom of the vapor-liquid separator 135a is returned, via fluidly connected duct 135b, to the stripper unit 130. In low-pressure stripper operation, the overhead vapor stream is then transferred to the absorber 140 via duct 135.

The systems described in detail above operate at a pressure of 20 bar. However, it shall be considered obvious that the systems are also applicable for operation at a lower pressure, in an arrangement where the available parameters have been adjusted for achieving the $NH_3$ capturing effect as is intended.

The gas entering the water wash unit 102 via the duct 107a comprises typically $CO_2$ in a concentration of 1.5-2.5% by volume.

The water wash unit 102 is typically operating at relatively high gas velocities, such as in the range of 2-8 m/s, for example about 2.5 m/s.

By introducing a portion of $CO_2$, via a $CO_2$ containing liquid, into the water wash unit 102, the mole ratio between the moles of ammonia to the moles of $CO_2$ may be lowered. Such lowering of the mole ratio between the moles of ammonia to the moles of $CO_2$ suppresses the equilibrium vapor pressure of $NH_3$ present over the surface of the $CO_2$ enriched wash water liquid utilized in the water wash unit 102. In the top section 104 of the water wash unit 102, the concentration of ammonia of the $CO_2$ enriched wash water liquid, forwarded via duct 106, may typically be 0.005 to 0.2 mol/liter of $NH_3$. The ratio of moles of ammonia ($NH_3$) to moles of carbon dioxide ($CO_2$) for the $CO_2$ enriched wash water liquid forwarded via duct 106 may typically be kept at about 0.05 to 10, and more typically at about 0.05 to 2. In the bottom section 103 of the water wash unit 102, the concentration of ammonia of the $CO_2$ enriched wash water liquid, forwarded via duct 105, may be 0.5 to 3 mol/liter of $NH_3$. The ratio of moles of ammonia ($NH_3$) to moles of carbon dioxide ($CO_2$) for the $CO_2$ enriched wash water liquid forwarded via duct 105 may typically be kept at about 0.05 to 10, and more typically at about 0.5 to 10.

The $CO_2$ product cooler unit 120 is also connected to the regenerator unit 142, the regenerator unit 142 being arranged for regenerating absorption liquid that has been utilized in the absorber 140 for absorbing $CO_2$ from, for example, flue gas in accordance with the chilled ammonia process. Hence, the $CO_2$ product cooler unit 120 cools $CO_2$ that has been released from the ammoniated solution in the regenerator unit 142.

Figure 2:
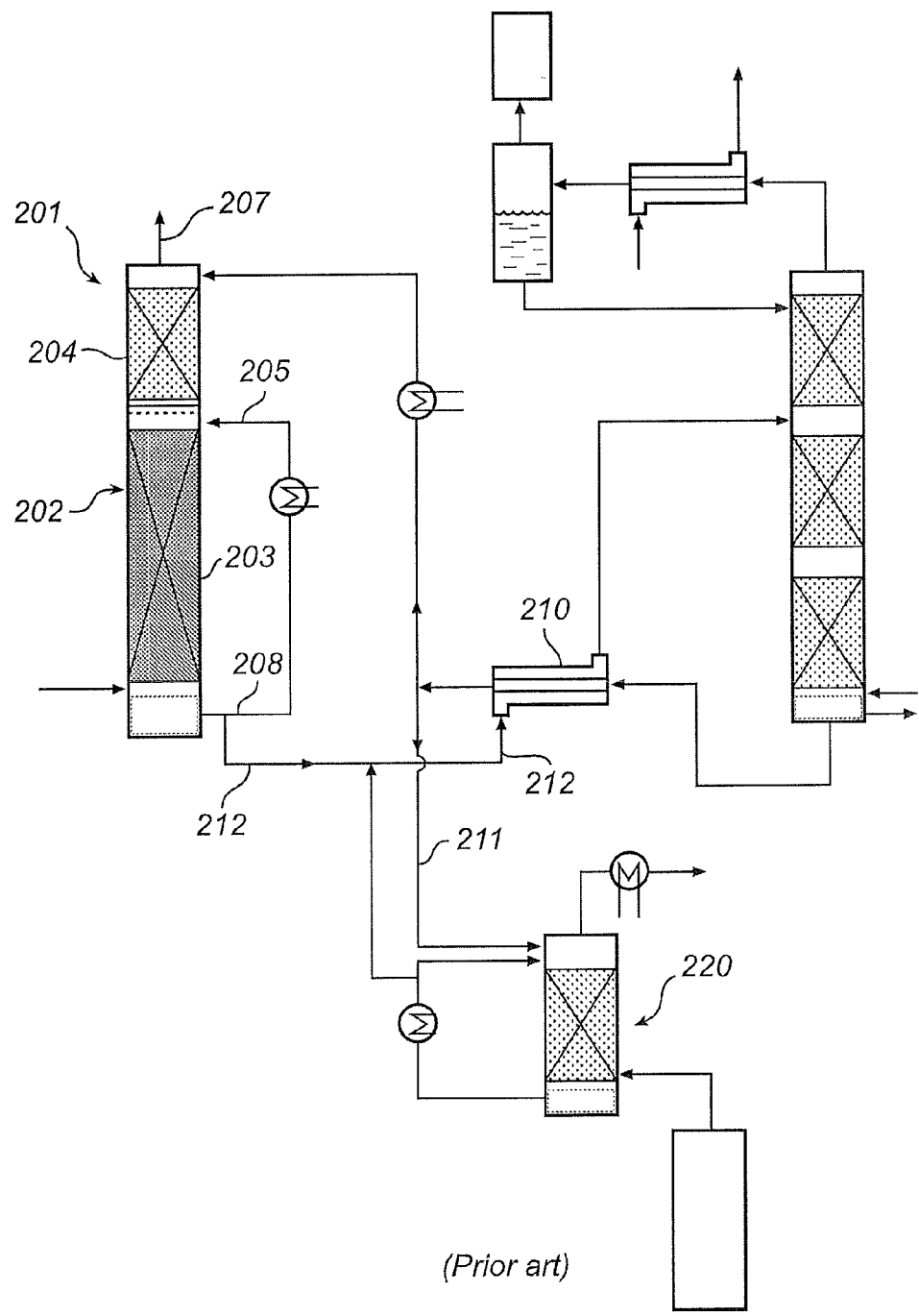
FIG. 2 is a flow diagram generally depicting a known ammonia based gas purification system (prior art).

FIG. 2 is a schematic representation of a previously used gas purification system 201 (prior art). The system comprises a water wash unit 202 arranged to allow contact between a gas stream to be purified and one or more wash liquids.

The water wash unit 202 is represented in FIG. 2 and comprises a two stage wash system having sections with different packing. The bottom section 203 in the lower part of the water wash unit 202 comprises a structured packed bed and is operated in circulation mode for the solution and with once through mode for the flue gas. The top section 204 in the top part of the water wash unit 202 comprises a random packed bed operating in counter current mode with once through water flow and once through flue gas flow.

The used wash water liquid leaving the water wash unit 202 and containing absorbed ammonia leave the water wash unit via fluidly connected duct 208. The used wash water liquid may be recycled and reintroduced to the water wash unit 202 and its lower part via duct 205.

Flue gas having a reduced concentration of ammonia leaves the water wash unit 202 via duct 207 and may be forwarded to a Direct Contact Cooler (DCC) unit, not illustrated for reasons of maintaining clarity of illustration.

The wash water is fed to the heat exchanger unit 210 via duct 212. Water is forwarded from the heat exchanger unit 210 to the $CO_2$ product cooler unit 220 via the duct 211.

Advantages of embodiments described hereinabove in connection with FIG. 1 include:

Low concentration of $NH_3$ in the treated flue gas discharged from the water wash unit 102;

Low consumption of acidifying components, like sulfuric acid, following treatment, such as in the direct contact cooling system (DCC) and direct contact heating (DCH) system;

Maintainability of the desired solution molarity in the systems for absorption and regeneration;

Lower energy consumption of the stripper process;

Minimizing of amount of liquid required in the water wash unit 102 to capture ammonia.

EXAMPLES

Example 1

Verification of Computer Model

A computer model with a simulated water wash unit (A) in accordance with the above described prior art system (FIG. 2) was compared with test results (B) for a similar prior art system.

The simulation results showed 2.3% lower ammonia emission compared to the test results, as shown in Table 1. Hence, the computer model was considered a reasonable representation of a physical process and system.

TABLE 1

Comparison: Computer model to test result (prior art system)

| Case | | Inlet gas to water wash unit 202 | After bottom stage 203 | After top stage 204 | Unit |
|---|---|---|---|---|---|
| A (model) | $NH_3$ in gas | 8897 | 2404 | 312 (in duct 207) | ppm |
| B (test) | $NH_3$ in gas | 8897 | Not available | 319 (in duct 207) | ppm |

Example 2

Effect of Adding $CO_2$ Containing Liquid

An introduction of $CO_2$ containing liquid from the $CO_2$ product cooler 120 via duct 105 was made in a simulated water wash unit 102 (FIG. 1), thus $CO_2$ containing liquid was introduced to the bottom section 103 of the water wash unit 102, and was compared to introducing $CO_2$ containing liquid from the $CO_2$ product cooler 120 via duct 106, thus to the top section 104 of the water wash unit 102. The effect of the $CO_2$ containing liquid introduced in the water wash unit 102 is presented in table 2. The $CO_2$ containing liquid had a content of ammonia (mole/liter) of 0.54, and the mole ratio R was 1.05 (mole $NH_3$/mole $CO_2$), and the flow rate of $CO_2$ containing liquid was measured to about 59 l/min at a flue gas flow in duct 107b of about 40 800 kg/hour.

TABLE 2

Comparison: introduction of $CO_2$ containing liquid via duct 105, compared to introduction of $CO_2$ containing liquid via duct 106

| Case | | Inlet gas to water wash unit 102 | After bottom stage 103 | After top stage 104 | Unit |
|---|---|---|---|---|---|
| $CO_2$ via duct 105 | $NH_3$ in gas | 8897 (in duct 107a) | 1695 | 294 (in duct 107b) | ppm |
| $CO_2$ via duct 106 | $NH_3$ in gas | 8897 (in duct 107a) | 1736 | 171 (in duct 107b) | ppm |

The results presented in Table 2 show that supply of $CO_2$ containing liquid via duct 106 to the top stage 104 of the water wash unit 102 reduces the emission of ammonia by about 42% compared to introduction of $CO_2$ containing liquid via duct 105 to bottom stage 103.

When comparing to the prior art results of Table 1, it is clear that introducing $CO_2$ containing liquid via duct 105 results in a reduction of the ammonia emission of about 6% (reduction from 312 to 294 ppm of $NH_3$), and that introducing $CO_2$ containing liquid via duct 106 results in a reduction of the ammonia emission of about 45% (reduction from 312 to 171 ppm of $NH_3$).

Example 3

High Inlet Ammonia Concentration

Simulations were made to test the ammonia emission at high ammonia concentration in the flue gas forwarded to the water wash unit, in the example inlet ammonia is 16000 ppm.

Comparative example: Table 3 illustrates the simulated result with the prior art water wash unit 202 of FIG. 2.

TABLE 3

Comparative example: Ammonia capture of prior art water wash system 202.

|  | Inlet gas to water wash unit 202 | After bottom stage 203 | After top stage 204 |
|---|---|---|---|
| $NH_3$, (ppm) | 15948 | 10157 | 2263 |

Simulation of high ammonia concentration in gas and introduction of $CO_2$ containing liquid via duct 105 or via duct 106:

The gas flow rate was kept at the same level as in Comparative example. $CO_2$ containing liquid from the $CO_2$ product cooler unit 120 was, in a first simulation, added via the duct 105, to the bottom section 103 of the water wash unit 102. In a second simulation $CO_2$ containing liquid from the $CO_2$ product cooler unit 120 was added via the duct 106 to the top section 104 of the water wash unit 102. The $CO_2$ containing liquid was, in each simulation, added with a flow rate of 227 l/min at a flue gas flow in duct 107b of about 40 800 kg/hour, concentration of ammonia was kept at 1 mole/liter, and the mole ratio (mole $NH_3$/mole $CO_2$) was 1.05.

The results achieved are shown in Table 4:

TABLE 4

Ammonia capture of water wash system 102, $CO_2$ introduced via duct 105, or via duct 106.

| Case | | Inlet gas to water wash unit 102 | After bottom stage 103 | After top stage 104 |
|---|---|---|---|---|
| $CO_2$ via duct 105 | $NH_3$, (ppm) | 15948 | 4969 | 710 |
| $CO_2$ via duct 106 | $NH_3$, ppm | 15948 | 5605 | 159 |

As indicated above the emission of ammonia is reduced from about 2300 ppm (table 3) as obtained for the prior art water wash system 202, to about 710 ppm (table 4) with the water wash unit 102 with supply of $CO_2$ to bottom section 103 via duct 105, and is reduced to about 160 ppm (table 4) by introducing the $CO_2$ containing liquid to the wash water unit 102 at the top section 104 via the duct 106.

To summarize, a method for capturing ammonia present in combustion flue gas subjected to carbon dioxide removal, using a water wash unit (102) included in a chilled ammonia process, comprises:
providing $CO_2$ loaded liquid (122) comprising $CO_2$ dissolved in the liquid;
providing wash water liquid (108, 138);
combining the $CO_2$ loaded liquid with the wash water liquid to form $CO_2$ enriched wash water liquid (105, 106) before the liquid is added said water wash unit (102); and
bringing said combustion flue gas into contact with said $CO_2$ enriched wash water liquid by adding the $CO_2$ enriched wash water liquid to said water wash unit (102).

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A gas purification system for capturing of ammonia ($NH_3$) from combustion flue gas by contact with $CO_2$ enriched wash water liquid containing dissolved carbon dioxide $CO_2$ in liquid form wherein the system comprises:
a water wash unit for capturing ammonia $NH_3$;
one or more wash water liquid ducts for recirculating wash water liquid;
one or more units generating $CO_2$ loaded liquid;
a $CO_2$ loaded liquid duct for the $CO_2$ loaded liquid to flow through to the wash water liquid duct from the one or more units for generating $CO_2$ loaded liquid to suppress the equilibrium vapor pressure of $NH_3$ over the wash water liquid; and
one or more $CO_2$ enriched wash water liquid ducts for the $CO_2$ enriched wash water liquid to flow through for integrating the $CO_2$ loaded liquid and the wash water liquid to the water wash unit for bringing the $CO_2$ enriched wash water liquid into contact with the combustion flue gas.

2. A gas purification system according to claim 1 wherein the units for generating $CO_2$ loaded liquid is a $CO_2$ product cooler and/or a $CO_2$ compressor system, working separately or together for generating $CO_2$ loaded liquid.

3. A gas purification system according to claim 1, wherein the wash water unit comprises at least one packed bed section.

4. The gas purification system according to claim 1, wherein the $CO_2$ enriched wash water liquid is introduced to the bottom section of the wash water unit by $CO_2$ enriched wash water liquid duct.

5. The gas purification system according to claim 1, wherein the $CO_2$ enriched wash water liquid is introduced to the upper section of the wash water unit by $CO_2$ enriched wash water liquid duct.

6. The gas purification system according to claim 1, further comprising at least one heat exchanger and wherein the wash water unit operates at a temperature of 1° C. to 10° C.

7. The gas purification system according to claim 1, wherein the carbon dioxide $CO_2$ in liquid form is reintroduced into the wash water liquid after separation and liquefaction in a $CO_2$ product cooler unit forming a $CO_2$ cooler $CO_2$ loaded wash water solution.

8. A gas purification system according to claim 1, wherein the carbon dioxide $CO_2$ in liquid form is reintroduced into the wash water liquid after separation and liquefaction in a $CO_2$ compressor system forming an interstage cooler water $CO_2$ rich condensate.

9. A gas purification system according to claim 1, wherein the carbon dioxide $CO_2$ in liquid form is reintroduced into the water wash unit after separation and liquefaction in a $CO_2$ product cooler unit in combination with a $CO_2$ compressor system.

10. A gas purification system for capturing of ammonia ($NH_3$) from combustion flue gas by contact with a $CO_2$ enriched wash water liquid containing dissolved carbon dioxide $CO_2$ in liquid form wherein the system comprises:
- a water wash unit for capturing ammonia the unit comprising at least first and second stages;
- at least one or more wash water liquid ducts for providing a wash water liquid;
- at least one or more units for generating a $CO_2$ loaded liquid;
- at least one or more $CO_2$ loaded liquid ducts for fluidly connecting the units for generating the $CO_2$ loaded liquid to the wash water liquid ducts and to form the $CO_2$ enriched wash water liquid; and
- wherein the first and second stages further comprise at least one or more ducts for receiving the $CO_2$ enriched wash water liquid and bring the $CO_2$ enriched wash water liquid into contact with the combustion flue gas.

* * * * *